US012634073B2

(12) United States Patent
Shapin et al.

(10) Patent No.: US 12,634,073 B2
(45) Date of Patent: May 19, 2026

(54) NETWORK NODE, USER EQUIPMENT AND METHODS FOR CHANNEL ESTIMATION FOR PERIODIC TRANSMISSIONS

(71) Applicant: Telefonaktiebolaget LM Ericsson (publ), Stockholm (SE)

(72) Inventors: Alexey Shapin, Luleå (SE); Jonas Fröberg Olsson, Ljungsbro (SE); Yufei Blankenship, Kildeer, IL (US)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 373 days.

(21) Appl. No.: 18/261,775

(22) PCT Filed: Jan. 17, 2022

(86) PCT No.: PCT/SE2022/050049
§ 371 (c)(1),
(2) Date: Jul. 17, 2023

(87) PCT Pub. No.: WO2022/154746
PCT Pub. Date: Jul. 21, 2022

(65) Prior Publication Data
US 2024/0121042 A1      Apr. 11, 2024

Related U.S. Application Data

(60) Provisional application No. 63/138,612, filed on Jan. 18, 2021.

(51) Int. Cl.
H04L 5/00          (2006.01)
H04W 72/23        (2023.01)

(52) U.S. Cl.
CPC .......... H04L 5/0048 (2013.01); H04L 5/0094 (2013.01); H04W 72/23 (2023.01); H04L 5/0007 (2013.01)

(58) Field of Classification Search
CPC ... H04L 5/0048; H04L 5/0094; H04L 5/0007; H04L 1/0026; H04W 72/23; H04B 17/345
See application file for complete search history.

(56) References Cited

U.S. PATENT DOCUMENTS

2019/0174327 A1*   6/2019   You ......................... H04W 4/70
2019/0246421 A1    8/2019   Zhou et al.
(Continued)

FOREIGN PATENT DOCUMENTS

EP        3041154 A1     7/2016
EP        3509343 A1     7/2019
(Continued)

OTHER PUBLICATIONS

International Search Report and Written Opinion dated Apr. 1, 2022 for International Application No. PCT/SE2022/050049 filed Jan. 17, 2022, consisting of 16-pages.
(Continued)

*Primary Examiner* — Kevin T Bates
*Assistant Examiner* — Poonam Sharma
(74) *Attorney, Agent, or Firm* — Weisberg I.P. Law, P.A.

(57)          ABSTRACT

A method performed by a network node for handling communication in a communication network. The network node configures a CSI reference resource as a function of a periodic transmission time of a downlink semi-persistent scheduling configuration or a group of downlink semi-persistent scheduling configurations and/or as a function of a dynamically scheduled physical downlink shared channel time.

19 Claims, 5 Drawing Sheets

(56)                    References Cited

U.S. PATENT DOCUMENTS

| 2019/0313423 | A1* | 10/2019 | Gupta | H04B 17/309 |
| 2020/0107319 | A1* | 4/2020 | Bagheri | H04W 72/23 |
| 2025/0211408 | A1* | 6/2025 | Mayakumari | H04B 7/0626 |

FOREIGN PATENT DOCUMENTS

| WO | 2019098938 | A1 | 5/2019 |
| WO | 2019103562 | A1 | 5/2019 |

OTHER PUBLICATIONS

ETSI TS 138214 V15.7.0; Technical Specification; 5G; NR; Physical layer procedures for data (3GPP TS 38.214 version 15.7.0 Release 15); Oct. 2019, consisting of 108-pages.

ETSI TS 136331 V15.7.0; Technical Specification; LTE; Evolved Universal Terrestrial Radio Access (E-UTRA); Radio Resource Control (RRC); Protocol specification (3GPP TS 36.331 version 15.7.0 Release 15); Oct. 2019, consisting of 967-pages.
ETSI TS 138211 V15.7.0; Technical Specification; 5G; NR; Physical channels and modulation (3GPP TS 38.211 version 15.7.0 Release 15); Oct. 2019, consisting of 100-pages.
3GPP TSG-RAN WG1 #87 R1-1611984; Title: Discussion on NR CSI configuration; Agenda Item: 7.1.3.3; Source: Intel Corporation; Document for: Discussion and Decision; Date and Location: Nov. 14-18, 2016, Reno, USA, consisting of 5-pages.
3GPP TSG RAN WG1 Meeting #92bis R1-1804785; Title: Maintenance for CSI Measurement; Agenda Item: 7.1.2.2.1; Source: Qualcomm Incorporated; Document for: Discussion/Decision; Date and Location: Apr. 16-20, 2018, Sanya, China, consisting of 11-pages.
3GPP TSG-RAN1 Meeting #96 R1-1902119; Title: Corrections to CSI reference resource; Source to WG: Ericsson; Source to TSG: RAN1 Work Item Code: NR_newRAT-Core; Date and Location: Feb. 25-Mar. 1, 2019, Athens, Greece, consisting of 3-pages.

* cited by examiner

100

UE 130

Processor 1360

Transmitting module 1320

Determing module 1330

Processing module 1340

Receiving module 1310

Memory 1350

Computer
program
1370

Carrier
1380

UE 130

Processor 1360

Communication
interface

Memory 1350

NETWORK NODE, USER EQUIPMENT AND METHODS FOR CHANNEL ESTIMATION FOR PERIODIC TRANSMISSIONS

CROSS-REFERENCE TO RELATED APPLICATIONS

This application is a Submission Under 35 U.S.C. § 371 for U.S. National Stage Patent Application of International Application No.: PCT/SE2022/050049, filed Jan. 17, 2022 entitled "NETWORK NODE, USER EQUIPMENT AND METHODS FOR CHANNEL ESTIMATION FOR PERIODIC TRANSMISSIONS," which claims priority to U.S. Provisional Application No. 63/138,612, filed Jan. 18, 2021, entitled "NETWORK NODE, USER EQUIPMENT AND METHODS FOR CHANNEL ESTIMATION FOR PERIODIC TRANSMISSIONS," the entireties of both of which are incorporated herein by reference.

TECHNICAL FIELD

Embodiments herein relate to a network node, a user equipment (UE) and methods therein for channel measurement. In particular, they relate to configuring a reference resource for a UE to perform channel measurement and reporting for, for example, periodic transmissions in a wireless communication system.

BACKGROUND

A Universal Mobile Telecommunications System (UMTS) is a third generation (3G) telecommunication network, which evolved from the second generation (2G) Global System for Mobile Communications (GSM). Specifications for the Evolved Packet System (EPS), also called a Fourth Generation (4G) network or Long-Term Evolution (LTE), have been completed within the 3rd Generation Partnership Project (3GPP) and this work continues in the coming 3GPP releases, for example to specify a Fifth Generation (5G) New Radio (NR) network.

New radio (NR) standard in 3GPP is designed to provide service for multiple use cases such as enhanced mobile broadband (eMBB), ultra-reliable and low latency communication (URLLC), and machine type communication (MTC). Each of these services has different technical requirements. For example, the general requirement for eMBB is high data rate with moderate latency and moderate coverage, while URLLC service requires a low latency and high reliability transmission but perhaps for moderate data rates.

Since 5G NR deal with many traffic types, quite many of them are periodic like voice, video, machine type applications such as control loops, using radio network as a bridge for time-sensitive communication etc. For that kind of traffic, packet arrival and periodicity can be provided to gNB (or gNodeB) which can learn the traffic pattern itself and then apply deterministic scheduling for such radio bearer. Scheduling in NR:

In 3GPP NR standard, downlink control information (DCI) which is transmitted in a physical downlink control channel (PDCCH), is used to indicate the downlink (DL) data related information, uplink (UL) related information, power control information, slot format indication, etc. There are different formats of DCI associated with each of these control signals and the UE identifies them based on different radio network temporary identifiers (RNTIs).

A UE is configured by higher layer signalling to monitor for DCIs in different resources with different periodicities, etc. DCI formats 1_0, 1_1, and 1_2 are used for scheduling DL data which is sent in physical downlink shared channel (PDSCH), and includes time and frequency resources for DL transmission, as well as modulation and coding information, hybrid automatic repeat request (HARQ) information, etc.

In case of DL semi-persistent scheduling (SPS) and UL configured grant type 2, part of the scheduling including the periodicity is provided by the higher layer configurations, while the rest of scheduling information such as time domain and frequency domain resource allocation, modulation and coding, etc, are provided by the DCI in PDCCH.

Uplink Control Information:

Uplink control information (UCI) is a control information sent by a UE to a gNB. It comprises:

Hybrid-ARQ acknowledgement (HARQ-ACK) which is a feedback information corresponding to the received downlink transport block whether the transport block reception is successful or not, Channel state information (CSI) related to downlink channel conditions which provides gNB with channel-related information useful for DL scheduling, including information for multi-antenna and beamforming schemes, and Scheduling request (SR) which indicates a need of UL resources for UL data transmission.

UCI is typically transmitted on physical uplink control channel (PUCCH). However, if a UE is transmitting data on the Physical Uplink Shared Channel (PUSCH) with a valid PUSCH resource overlapping with PUCCH, UCI can be multiplexed with UL data and transmitted on PUSCH instead, if the timeline requirements for UCI multiplexing is met.

Channel Measurement:

Due to varying nature of wireless communication channel, data transmission between gNB and UE needs to adapt the modulation scheme and code rate to suit different channel conditions. In NR downlink transmission methods such as multi-layer transmission, transmission point selection, beam selection etc are very flexible. Therefore, in NR the CSI (Channel State Information) may comprise one or more out of:

CQI: Channel Quality Indicator

PMI: Pre-coding Matrix Indicator

CRI: CSI-RS Resource Indicator

LI: Layer Indicator

RI: Rank Indicator

SSBRI: SS/PBCH Block Resource Indicator

Layer one-reference signal received power (L1-RSRP)

In NR the reported CQI value can be with respect to one of three tables, Table 1, Table 2 and Table 3. If Table 1 or Table 2 is configured the UE reports a CQI value such that a PDSCH with modulation, target code rate and transport block size corresponding to the CQI value assigned on a so-called CSI reference resource could be received with a BLEP (BLock-Error Probability) not exceeding 10%. For Table 1 the highest modulation is 64QAM while for Table 2 the highest modulation is 256QAM. For Table 3 the highest modulation is 64QAM but the BLEP shall not exceed $10^{-5}$. Section 5.2.2.1 in 38.214, v15.7.0 reads as:

The CQI indices and their interpretations are given in Table 5.2.2.1-2 or Table 5.2.2.1-4 for reporting CQI based on QPSK, 16QAM and 64QAM. The CQI indices and their interpretations are given in Table 5.2.2.1-3 for reporting CQI based on QPSK, 16QAM, 64QAM and 256QAM. Based on an unrestricted observation interval in time unless specified otherwise in this Subclause, [and an unrestricted observation interval in frequency-TBD], the UE shall derive for each CQI value reported in uplink slot n the highest CQI index which satisfies the following condition:

A single PDSCH transport block with a combination of modulation scheme, target code rate and transport block size corresponding to the CQI index, and occupying a group of downlink physical resource blocks termed the CSI reference resource, could be received with a transport block error probability not exceeding:

0.1, if the higher layer parameter cqi-Table in CSI-ReportConfig configures 'table 1' (corresponding to Table 5.2.2.1-2), or 'table2' (corresponding to Table 5.2.2.1-3), or 0.00001, if the higher layer parameter cqi-Table in CSI-ReportConfig configures 'table3' (corresponding to Table 5.2.2.1-4).

The CSI reporting can be time-restricted for either or both of the channel and interference measurement by parameters:

timeRestrictionForChannelMeasurements timeRestrictionForInterferenceMeasurements If time restriction for measurement is configured, the CSI reported shall be based on only the most recent measurement (Section 5.2.2.1 in 38.214, v15.7.0):

If a UE is configured with higher layer parameter timeRestrictionForChannelMeasurements in CSI-ReportConfig, the UE shall derive the channel measurements for computing CSI reported in uplink slot n based on only the most recent, no later than the CSI reference resource, occasion of NZP CSI-RS (defined in [4, TS 38.211]) associated with the CSI resource setting.

If a UE is configured with higher layer parameter timeRestrictionForInterferenceMeasurements in CSI-ReportConfig, the UE shall derive the interference measurements for computing the CSI value reported in uplink slot n based on the most recent, no later than the CSI reference resource, occasion of CSI-IM and/or NZP CSI-RS for interference measurement (defined in [4, TS 38.211]) associated with the CSI resource setting.

This means that if time-restriction is enabled, then the reported CSI is a momentary evaluation how the channel and interference looked like at the time of the channel measurement and the time of the interference measurement. The time for measurement of the channel may not be the same as the time of the interference measurement. If, however, the time-restriction is not configured the UE can report CSI based on more than one measurement. How the UE obtains CSI based on several measurements is up to UE implementation.

NR also supports CSI reporting of L1-RSRP which a channel quality measures without taking spatial properties nor interference into account.

CSI reporting configured via CSI-ReportConfig can have one, two or three resource settings where resource settings can be one of three types: aperiodic, semi-persistent and periodic. A resource setting specifies one or more measurement resources. If one resource setting is configured, the resourcesForChannelMeasurement is used for L1-RSRP channel measurement. If two resource settings are configured, resourcesForChannelMeasurement is used for channel measurement while the second one is used for interference measurement. The second resource setting is either specified via csi-IM-ResourceForInterference or nzp-CSI-RS-ResourcesForInterference. When a nzp-CSI-RS resource for interference measurement is configured, the UE performs channel estimation on the actual CSI-RS transmitted but interprets the signal as interference in CSI evaluation. Three resources settings may also be configured wherein resourcesForChannelMeasurement specifies resources for channel measurement and both the csi-IM-ResourceForInterference and nzp-CSI-RS-ResourcesForInterference specifies the resources for interference measurement.

Periodic CSI reports are sent on PUCCH, UCI on PUSCH when there is PUSCH data, and may be linked to periodic or semi-static resource setting(s). Semi-persistent CSI reports may be sent on PUCCH or PUSCH with or without PUSCH data and may also be linked to periodic or semi-static resource setting(s). Only aperiodic CSI reports can be linked to all three types of resource settings, periodic, semi-static and aperiodic. For aperiodic CSI reports a CSI-Aperiodic-TriggerState is associated with one or more CSI-ReportConfig and a CSI trigger state is further associated with a codepoint of the "CSI request" field in DCI.

SUMMARY

As part of developing embodiments herein one or more problems were identified and will first be discussed.

In principle, a gNB may allocate reference resources for channel measurement located inside and outside of actual resource allocation for a UE. However, in case of periodic and deterministic URLLC traffic, the gNB may find it useful only to measure certain orthogonal frequency-division multiplexing (OFDM) symbols at certain periodicity, to be able to reallocate PDSCH in frequency, and a little in time to compensate for time drifting of packet arrival. To accomplish that, the measurement resources should be configured in relation with periodically allocated resources. However, changing of semi-persistent scheduling (SPS) allocation by dynamic DCI or activation of new DL SPS configuration may lead to RRC configuration for CSI-reference signal (RS)/interference measurement (IM) and rate matching patterns, which requires additional signaling exchange between the gNB and the UE. Moreover, if the traffic is URLLC, the gNB cannot skip one of the periodic transmissions to perform RRC reconfiguration and it would be extra difficult or even impossible to keep the service running without interruption.

Therefore, there is a need for an improved network node and method therein for configuring resources for channel measurement and reporting for a UE, e.g. a communication device, with periodic traffic in a wireless communication system.

According to an aspect of embodiments herein, a method performed by a network node for handling communication in a communication network is provided. The network node configures a CSI reference resource as a function of a periodic transmission time of a DL SPS configuration or a group of DL SPS configurations and/or as a function of a dynamically scheduled PDSCH time.

According to another aspect of embodiments herein, a method performed by a UE for handling communication in a communication network is provided. The UE derives a CSI reference resource based on a dynamically scheduled PDSCH, a DL SPS configuration or a group of DL SPS configurations. The UE further performs a channel estimation based on the CSI reference resource. The UE further generates a CSI report based on the channel estimation. The UE further transmits the CSI report to a network node.

According to a further aspect of embodiments herein, a network node for handling communication in a communication network is provided. The network node is configured to configure a CSI reference resource as a function of a periodic transmission time of a DL SPS configuration or a group of DL SPS configurations and/or as a function of a dynamically scheduled PDSCH time. According to yet another aspect of embodiments herein, a UE for handling communication in a communication network is provided. The UE is configured to derive a CSI reference resource based on a dynamically scheduled PDSCH, a DL SPS configuration or a group of DL SPS configurations. The UE is further configured to perform channel estimation based on the CSI reference resource. The UE is further configured to generate a CSI report based on the channel estimation. The UE is further configured to transmit the CSI report to a network node.

Thus, according to some embodiments herein, the network node may configure a CSI reference resource as a function of the periodic transmission time of a desired DL SPS configuration, or a group of DL SPS configurations in time domain.

According to some embodiments herein, the network node may configure a CSI reference resource as a function of dynamically scheduled PDSCH time, e.g., to coincide with PDSCH in time.

Furthermore, according to some embodiments herein, the CSI reference resource may be defined or configured to start X OFDM symbols before DL SPS or dynamic PDSCH transmission and to end Y OFDM symbols after the end of the PDSCH transmission.

According to some embodiments herein, the CSI reference resource may be configured to be related with only a subset of PDSCH transmissions within a defined period.

According to some embodiments herein, the network node may configure CSI-RS and/or CSI-IM periodicity, and offset depending on DL SPS periodicity.

According to some embodiments herein, the CSI reference resource may be configured to correspond to the group of downlink physical resource blocks that are used by the desired DL SPS configuration, or a group of DL SPS configurations, in the frequency domain.

According to some embodiments herein, the bandwidth of the CSI reference resource may be configured to contain the same amount of physical resource blocks (PRB) used by the desired DL SPS configuration, while the location of the PRBs may vary according to, e.g., wideband CQI report verses sub-band CQI report.

According to some embodiments herein, a CSI-RS may be configured based on the needs of DL SPS.

According to some embodiments herein, time domain resources of a non-zero power CSI-RS may be configured as a function of the time domain resources used by the target DL SPS configuration(s), wherein the time domain resources include the periodicity and slot offset.

According to some embodiments herein, the CSI-RS may be transmitted with a N1 times a periodicity of target DL SPS configurations.

According to some embodiments herein, the network node may configure a UE, e.g. a wireless device, with a csi-IM-ResourceElementPattern with a reference to the start of the SPS PDSCH instead of start of the slot.

According to embodiments herein a UE is configured to perform channel measurement dependent on dynamic PDSCH, DL SPS PDSCH or DL SPS PDSCH configuration group transmission parameters, then the UE may be configured to receive additional signalling to activate CSI reporting.

The UE may be configured to derive reference resource based on dynamic PDSCH, DL SPS PDSCH or DL SPS PDSCH configuration group transmission parameters; and performs channel estimation, generate channel state information report and send it back to the network node gNB.

The UE may be configured to receive additional signalling to deactivate CSI reporting.

Embodiments herein provide methods of channel estimation configuration for periodic traffic in time instances, for example, coinciding or partially coincided to PDSCH transmissions, such that reference signals are related to DL transmission by a configuration.

With the methods according to embodiments herein, a network node, e.g., gNB, may configure a reference signal, e.g., CSI-RS or CSI-IM resource, being related to DL transmission which will eliminate a need for RRC reconfiguration after changing transmission parameters, e.g., resource allocation in time, frequency and periodicity. In certain scenarios this approach is the only choice to avoid service interruption due to RRC reconfiguration and fulfill quality-of-service (QoS) for critical traffic.

BRIEF DESCRIPTION OF THE DRAWINGS

Examples of embodiments herein are described in more detail with reference to attached drawings in which:

FIG. 1 illustrating a wireless communication system in which embodiments herein may be implemented in;

DETAILED DESCRIPTION

Figure 1:
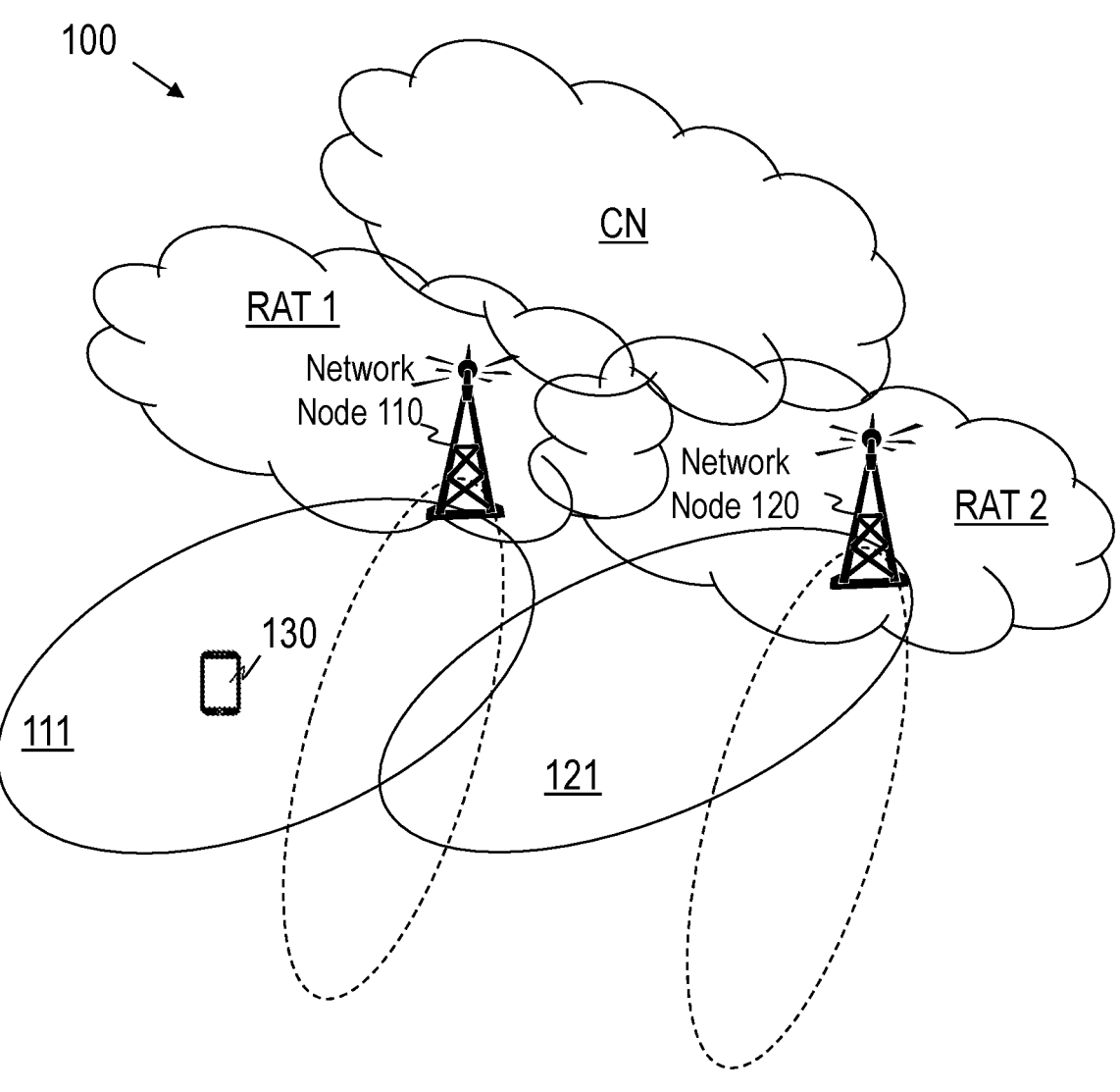

FIG. 1 is a schematic overview depicting a wireless communication system 100 in which embodiments herein may be implemented. The wireless communication system 100 may comprise any wireless system, communication network or cellular network, such as a Long-Term Evolution (LTE) network, any $3^{rd}$ Generation Partnership Project (3GPP) cellular network, a Fourth Generation (4G) network, a Fifth Generation (5G) or NR network etc.

In the wireless communication system 100, wireless communication devices e.g. a user equipment 130 such as a mobile station or terminal, a wireless terminal communicate via one or more Radio Access Technology e.g. RAT 1, RAT 2 to one or more core networks (CNs). It should be understood by the skilled in the art that "wireless communication device" is a non-limiting term which means any terminal, wireless communication terminal, user equipment, Machine Type Communication (MTC) device, IoT device, Device to Device (D2D) terminal, or node e.g. smart phone, laptop, mobile phone, sensor, relay, mobile tablets or even a small base station communicating within a cell. The terms "user equipment", "UE", "communication device" and "wireless communication device" are used interchangeable herein.

Network nodes operate in the wireless communication networks such as a first network node 110 and a second network node 120. The first network node 110 provides radio coverage over a geographical area, a cell area or a service area 111, which may also be referred to as a beam or a beam group where the group of beams is covering the service area of a first radio access technology RAT 1, such as 5G, LTE, LTE-M, Wi-Fi or similar. The second network node 120 provides radio coverage over a geographical area, a service area 121, which may also be referred to as a beam or a beam group where the group of beams is covering the service area of a second radio access technology RAT 2, such as 5G, LTE, LTE-M, Wi-Fi or similar. The service areas 111 and 121 for e.g. LTE and NR, may overlap at some area. The first and second network nodes 110, 120 may be refereed as eNB, gNB etc.

For URLLC and/or Industrial Internet of Things (IIoT) applications, data transmission tends to be periodical and deterministic. Thus, downlink data transmission heavily relies on DL SPS configuration or DL SPS configurations, and uplink data transmission can leverage UL configured grants (CG) configurations. In contrast, dynamically scheduled downlink transmission or uplink transmission incurs longer latency and also suffers from potential error of PDCCH reception.

CSI Reference Resource for DL Transmissions:

For URLLC and/or IIoT applications, the CSI reporting may be specialized for the DL SPS configurations, instead of dynamically scheduled downlink data.

In one example, in the time domain, the CSI reference resource is defined to be or configured as a function of the periodic transmission time of the desired DL SPS configuration, or a group of DL SPS configurations. For instance, the CSI reference resource in the time domain coincides with downlink slots with SPS configured. One embodiment is to use the following definition of a valid downlink slot for the purpose of determining CSI reference resource in time:

A slot in a serving cell shall be considered to be a valid downlink slot if:

it comprises at least one DL SPS occasion, and it does not fall within a configured measurement gap for that UE.

This embodiment may be extended to dynamically scheduled data as well, e.g. if a scheduler prefers periodically scheduled transmission by dynamic grant. For this example, in the time domain, the CSI reference resource is defined to be or configured as a function of dynamically scheduled PDSCH time, e.g. coincide with PDSCH in time. In such embodiment the CSI measurement resource can be restricted to be confined in the frequency allocation of the PDSCH.

According to one embodiment, in the time domain, CSI reference resource may be defined to start X OFDM symbols before DL SPS or dynamic PDSCH transmission and to end Y OFDM symbols after the end of the PDSCH transmission.

According to one embodiment, the CSI reference resource may be configured to be related with only a subset of PDSCH transmissions within a defined period. For example, if CSI measurements periodicity can be longer than DL SPS periodicity, thus, only every second or every third SPS PDSCH can have the CSI reference resource such as CSI-RS and/or CSI-IM resource. Moreover, CSI-RS and CSI-IM may be measured in different SPS PDSCH occasions at different periodicities. For example, if SPS PDSCH periodicity is 1 slot, i.e. transmission every slot, CSI-RS may be configured to be present in one transmission out of ten, i.e. 10 slots periodicity, while CSI-IM can be present and measured every second slot, i.e. 2 slots periodicity. To accomplish that, the network node can configure CSI-RS and/or IM periodicity and offset depending on DL SPS periodicity.

In another example, in the frequency domain, the CSI reference resource corresponds to the group of downlink physical resource blocks that are used by the desired DL SPS configuration, or a group of DL SPS configurations.

In another example, in the frequency domain, the bandwidth of the CSI reference resource contains the same amount of PRBs used by the desired DL SPS configuration, while the location of the PRBs may vary according to, e.g., wideband CQI report verses sub-band CQI report.

In some embodiments, the CSI-RS configuration may be defined to better satisfy the needs of the DL SPS. The CSI-RS may include several types, including non-zero power CSI-RS for DL channel measurement and zero-power CSI-RS for interference measurement. In one example, the time domain resources of the non-zero power CSI-RS may be configured as a function of the time domain resources used by the target DL SPS configuration(s), where the time domain resources may include the periodicity and slot offset. For instance, the CSI-RS may be transmitted with the N1 times the periodicity of target DL SPS configurations. Typical values of N1 may include: N1 is an integer value and N1=1, or 2. The offset of CSI-RS may be chosen such that the CSI-RS is transmitted in slots Cj which are N2 slots away from the slots Sj, where Sj represents a series of periodic slots with target DL SPS transmission, Cj=Sj+N2. Typical value of N2 include: N2=−1, i.e. CSI-RS in slots right before DL-SPS slots, N2=0, i.e. CSI-RS in same slots as DL-SPS slots, N2=1, i.e. CSI-RS in slots right after DL-SPS slots.

In some embodiments, the UE 130 may be configured with a csi-IM-ResourceElementPattern with a reference to the start of the SPS PDSCH instead of start of the slot. For example, the CSI-IM-Resource in 36.331 may be extended as highlighted by bolded text below:

```
CSI-IM-Resource ::=              SEQUENCE {
    csi-IM-ResourceId                CSI-IM-ResourceId,
    csi-IM-ResourceElementPattern    CHOICE {
        pattern0                         SEQUENCE {
            subcarrierLocation-p0            ENUMERATED { s0, s2, s4, s6, s8, s10 },
            symbolLocation-p0                INTEGER (0..12)
        },
        pattern1                         SEQUENCE {
            subcarrierLocation-p1            ENUMERATED { s0, s4, s8 },
            symbolLocation-p1                INTEGER (0..13)
        }
    }
    OPTIONAL,   -- Need M
        freqBand                     CSI-FrequencyOccupation
    OPTIONAL,   -- Need M
        periodicityAndOffset             CSI-ResourcePeriodicityAndOffset
    OPTIONAL,   -- Cond PeriodicOrSemiPersistent
    symbol-reference     SEQUENCE (SIZE(1..X)) OF SPS-ConfigIndex-r16 OPTIONAL,
    -- Cond PeriodicOrSemiPersistent

...
}
```

In a bandwidth part that is configured with multiple DL SPS, the various DL SPS configurations can be used for various service types, for example, a mixture of eMBB and URLLC services. The CSI-RS configuration and CSI reference resource can be specialized for the subset of DL SPS configurations that serve URLLC traffic, due to the more demanding latency and reliability requirements. The DL SPS configuration or DL SPS configurations for services with relaxed requirements do not require a specialized CSI report.

Activation/Deactivation of CSI Reporting:

In one embodiment, when CSI measurement and/or reporting is associated with the DL SPS configuration, then activation of the CSI reporting process may be done by activating one or more, e.g. group of, DL SPS configurations by DCI.

In some embodiments, when a SPS configuration associated with a CSI measurement and/or reporting is de-activated then the associated CSI measurement and/or reporting is also de-activated. In some such embodiments, when a CSI measurement and/or reporting is associated with multiple SPS configurations the CSI measurement and/or reporting is considered de-activated when all multiple SPS configurations are de-activated.

In some embodiments, the reporting of CSI associated with one or more SPS configurations are triggered to be sent X symbols after a SPS PDSCH occasion. In some such embodiments, when multiple SPS configurations c1, c2, . . . , cm are associated with a CSI measurement/reporting there may be a common CSI-IM resource associated with the multiple SPS configurations but the CSI-IM is considered present by the UE only if there is an activated SPS configuration overlapping the CSI-IM. Further, CSI is only transmitted X symbols after a SPS PDSCH occasion if the corresponding SPS configuration is activated.

In another embodiment, aperiodic CSI report associated with the dynamic PDSCH transmissions is triggered by DCI for scheduled PDSCH. For such case, offset from DCI and PUCCH and/or PUSCH resources should be either configured by network beforehand or signalled in the same DCI.

If the UE 130 is configured to perform channel measurement dependent on the dynamic PDSCH, DL SPS PDSCH or DL SPS PDSCH configuration group transmission parameters, then the UE 130:

- may receive additional signalling to activate CSI reporting;
- derives reference resource based on dynamic PDSCH, DL SPS PDSCH or DL SPS PDSCH configuration group transmission parameters;
- performs channel estimation, generate channel state information report and send it back to the network node 110, e.g. gNB;
- may receive additional signalling to deactivate CSI reporting.

Figure 2:
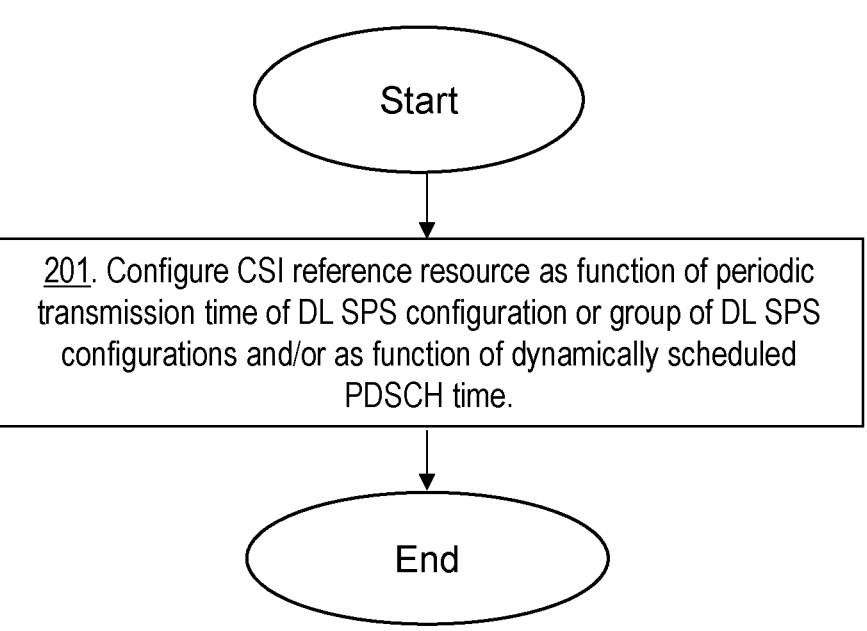
FIG. 2 is a flowchart depicting a method performed by a network node according to embodiments herein.

The method action performed by the network node 110 for handling communication in the communication network, according to embodiments herein, will now be described with reference to a flowchart depicted in FIG. 2.

Action 201. The network node 110 configures the CSI reference resource as a function of the periodic transmission time of the DL SPS configuration or the group of DL SPS configurations and/or as a function of a dynamically scheduled PDSCH time. E.g., in the time domain, the CSI reference resource coincides with downlink slots with the SPS configuration or the group of SPS configurations, and/or the CSI reference resource is e.g. configured to coincide with PDSCH in time. This is advantageous as it may eliminate the need for RRC reconfiguration after changing transmission parameters.

The CSI reference resource may start X OFDM symbols before the DL SPS configuration and/or the dynamic PDSCH transmission. The CSI reference resource may end Y OFDM symbols after the end of the PDSCH transmission. The CSI reference resource may be related with a subset of PDSCH transmissions within a defined period. The CSI reference resource may correspond to a group of DL PRBs that are used by the DL SPS configuration, or the group of DL SPS configurations, in the frequency domain. The bandwidth of the CSI reference resource may contain the same amount of PRBs as used by the DL SPS configuration. The location of the PRBs may vary. The CSI-RS and/or IM, periodicity, and offset may be configured depending on the DL SPS periodicity. A CSI-RS may be configured based on the needs of the DL SPS configuration. Time domain resources of a non-zero power CSI-RS may be configured as a function of the time domain resources used by the DL SPS configuration, wherein the time domain resources may comprise periodicity and slot offset. A CSI-RS may be transmitted with N1 times the periodicity of the DL SPS configuration. N1 may be an integer value.

Figure 3:
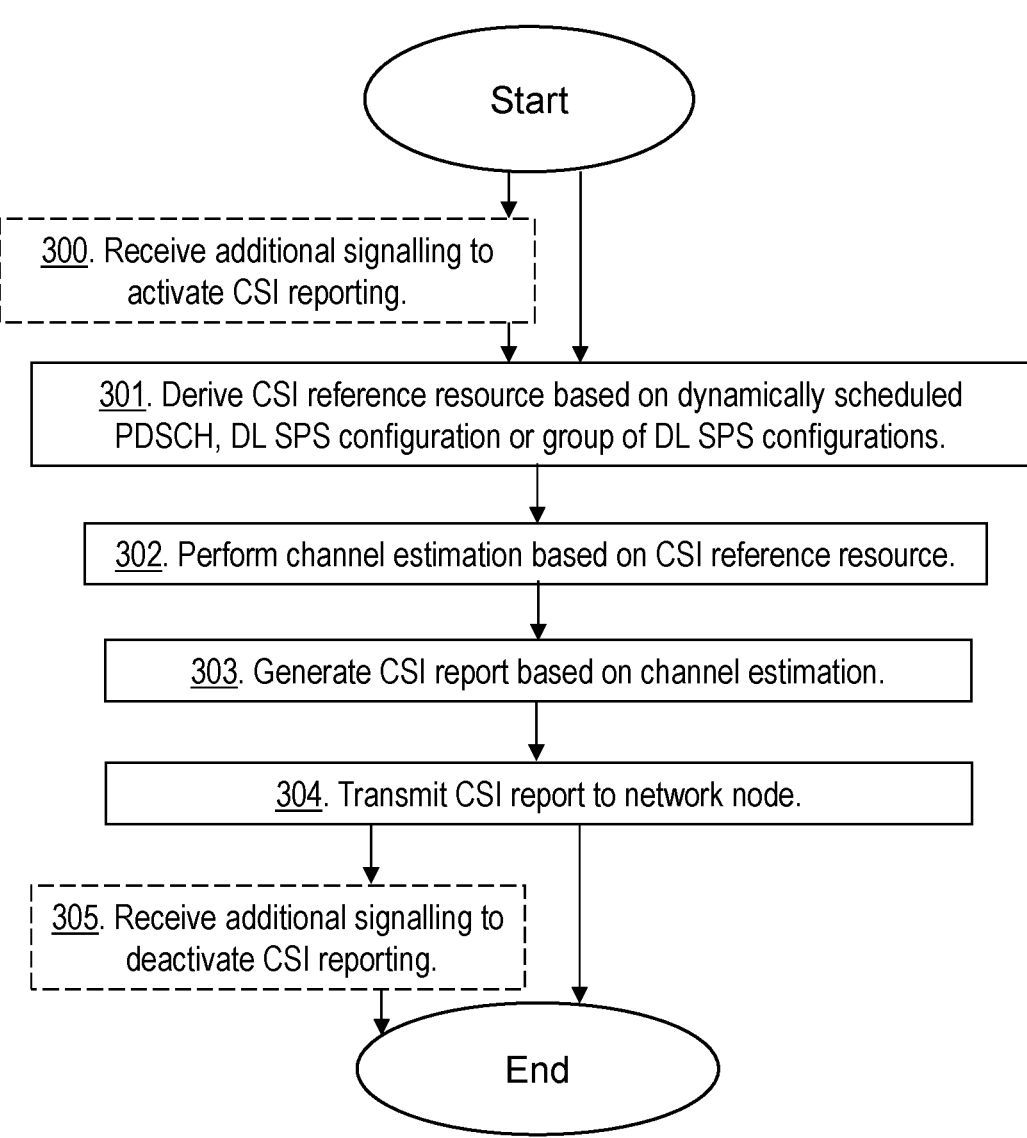
FIG. 3 is a flowchart depicting a method performed by a UE according to embodiments herein.

The method actions performed by the UE 130, for handling communication in the communication network, according to embodiments herein, will now be described with reference to a flowchart depicted in FIG. 3. The actions do not have to be taken in the order stated below but may be taken in any suitable order. Actions performed in some embodiments are marked with dashed boxes.

Action 300. The UE 130 may receive additional signalling to activate CSI reporting.

Action 301. The UE 130 derives a CSI reference resource based on the dynamically scheduled PDSCH, the DL SPS configuration or the group of DL SPS configurations. For example, when the UE 130 is configured to perform the channel measurement dependent on the dynamic PDSCH, DL SPS PDSCH or DL SPS PDSCH configuration group transmission parameters, the UE 130 derives the CSI reference resource based on the dynamically scheduled PDSCH, the DL SPS configuration or the group of DL SPS configurations.

Action 302. The UE 130 then performs a channel estimation based on the CSI reference resource.

Action 303. The UE 130 generates the CSI report based on the channel estimation.

Action 304. The UE 130 then transmits, e.g. sends, the CSI report to the network node 110.

Action 305. The UE 130 may receive additional signalling to deactivate CSI reporting.

Figure 4:
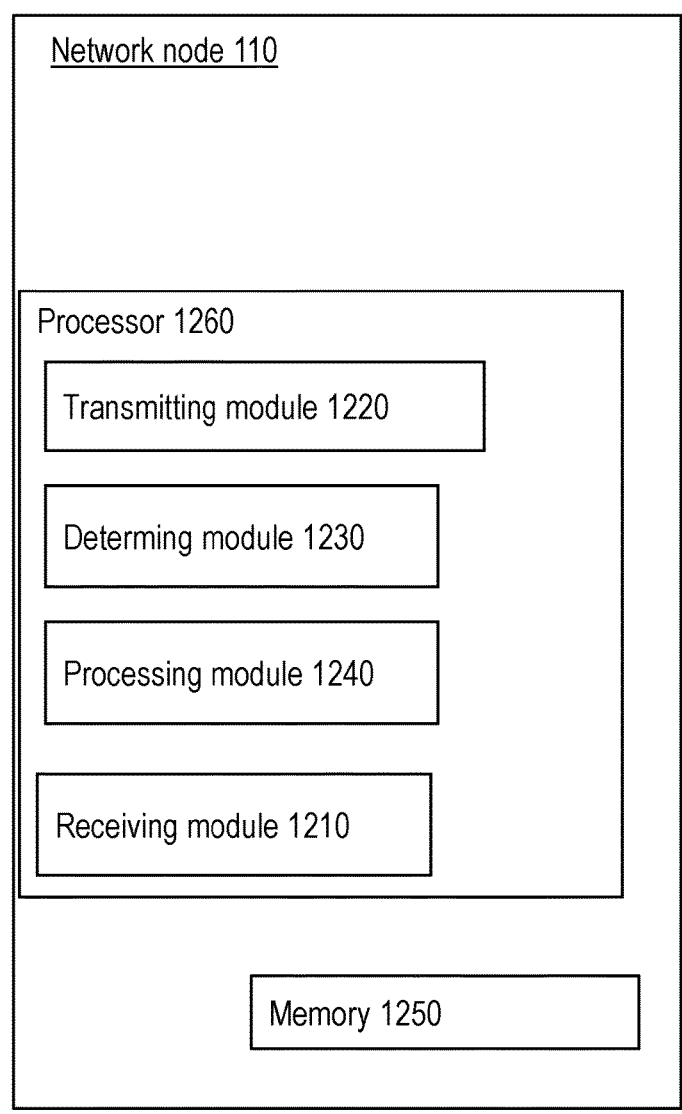
FIG. 4 is a schematic block diagram illustrating one embodiment of a network node.
Figure 4:
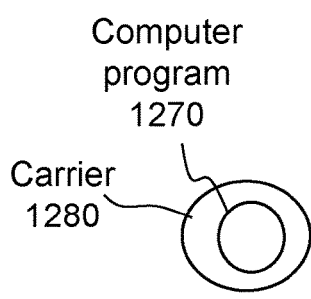
Figure 4:
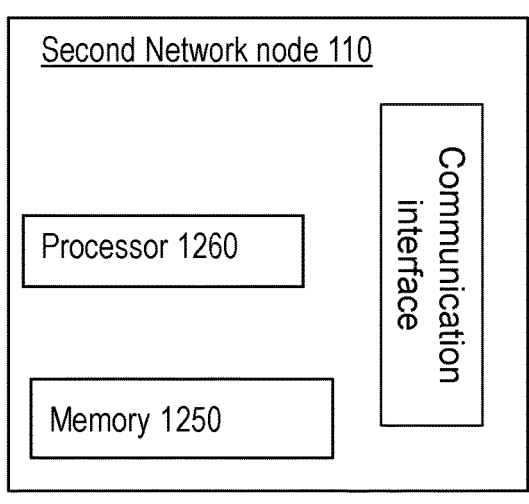

To perform the method in the network node 110, the network node 110 comprises modules as shown in two embodiments in FIG. 4. The network node 110 is configured to configure the CSI reference resource as a function of the periodic transmission time of the DL SPS configuration or the group of DL SPS configurations, and/or as the function of the dynamically scheduled PDSCH time. The CSI reference resource may be adapted to start X OFDM symbols before the DL SPS configuration and/or the dynamic PDSCH transmission. The CSI reference resource may be adapted to end Y OFDM symbols after the end of the PDSCH transmission. The CSI reference resource may be related with the subset of PDSCH transmissions within the defined period. The CSI-RS and/or IM periodicity, and offset may be configured depending on the DL SPS periodicity. The CSI reference resource may be adapted to correspond to the group of DL PRBs that are used by the DL SPS configuration, or the group of DL SPS configurations, in the frequency domain. The bandwidth of the CSI reference resource may be adapted to contain the same amount of PRBs as used by the DL SPS configuration, and wherein the location of the PRBs may vary. The CSI-RS may be configured based on the needs of the DL SPS configuration. The time domain resources of the non-zero power CSI-RS may be configured as the function of the time domain resources used by the DL SPS configuration, wherein the time domain resources may comprise periodicity and slot offset. The CSI-RS may be transmitted with N1 times the periodicity of the DL SPS configuration, wherein N1 may be an integer value. The network node 110 comprises a receiving module 1210, a transmitting module 1220, a determining module 1230, a processing module 1240, a memory 1250 etc. The receiving module 1210, transmitting module 1220, determining module 1230 and processing module 1240 may be combined as one module, shown as processor 1260.

The method according to embodiments herein may be implemented through one or more processors, such as the processor 1260 in the network node 110 together with computer program code for performing the functions and actions of the embodiments herein. The program code mentioned above may also be provided as a computer program product, for instance in the form of a data carrier 1280 carrying computer program code 1270, as shown in FIG. 4, for performing the embodiments herein when being loaded into the UE network node 110. One such carrier may be in the form of a CD ROM disc. It is however feasible with other data carriers such as a memory stick. The computer program code may furthermore be provided as pure program code on a server or a cloud and downloaded to the network node 110.

The memory 1250 in the network node 110 may comprise one or more memory units and may be arranged to be used to store received information, measurements, data, configurations and applications to perform the method herein when being executed in the network node 110.

Figure 5:
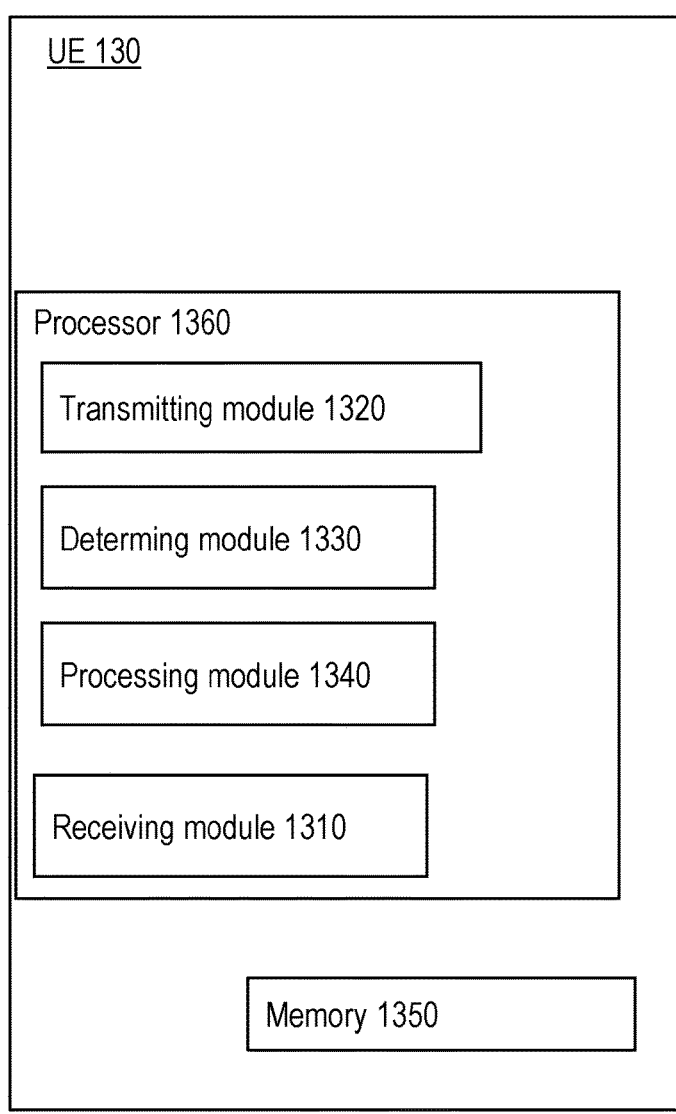
FIG. 5 is a schematic block diagram illustrating one embodiment of a UE.
Figure 5:
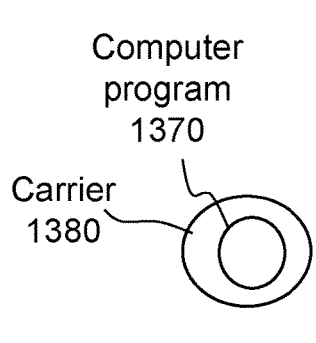

To perform the method in the UE 130, the UE 130 comprises modules as shown in two embodiments in FIG. 5. The UE 130 may be configured to receive the additional signalling to activate the CSI reporting. The UE 130 is configured to derive the CSI reference resource based on the dynamically scheduled PDSCH, the DL SPS configuration or the group of DL SPS configurations. The UE 130 is configured to perform the channel estimation based on the CSI reference resource. The UE 130 is configured to generate the CSI report based on the channel estimation. The UE 130 is configured to transmit the CSI report to the network node 110. The UE 130 may be configured to receive the additional signalling to deactivate the CSI reporting. The UE 130 comprises a receiving module 1310, a transmitting module 1320, a determining module 1330, a processing module 1340, a memory 1350 etc. The receiving module 1310, transmitting module 1320, determining module 1330 and processing module 1340 may be combined as one module, shown as processor 1360.

The method according to embodiments herein may be implemented through one or more processors, such as the processor 1360 in the UE 130 together with computer program code for performing the functions and actions of the embodiments herein. The program code mentioned above may also be provided as a computer program product, for instance in the form of a data carrier 1380 carrying computer program code 1370, as shown in FIG. 5, for performing the embodiments herein when being loaded into the UE 130. One such carrier may be in the form of a CD ROM disc. It is however feasible with other data carriers such as a memory stick. The computer program code may furthermore be provided as pure program code on a server or a cloud and downloaded to the UE 130.

The memory 1350 in the UE 130 may comprise one or more memory units and may be arranged to be used to store received information, measurements, data, configurations and applications to perform the method herein when being executed in the UE 130.

In some embodiments the general term "network node" is used and it can correspond to any type of radio-network node or any network node, which communicates with a wireless device and/or with another network node. Examples of network nodes are gNodeB, eNodeB, NodeB, base station (BS), access point (AP), transmission points, transmission nodes, etc.

In some embodiments the non-limiting term communication device or UE is used and it refers to any type of wireless device communicating with a network node and/or with another wireless device in a cellular or mobile communication system. Examples of UE are target device, device to device (D2D) UE, proximity capable UE (aka ProSe UE), machine type UE or UE capable of machine to machine (M2M) communication, Tablet, mobile terminals, smart phone, laptop embedded equipped (LEE), laptop mounted equipment (LME), USB dongles etc.

Embodiments are applicable to any radio access technology (RAT) or multi-RAT systems, where the devices receives and/or transmit signals, e.g. data, such as New Radio (NR), Wi-Fi, Long Term Evolution (LTE), LTE-Advanced, Wideband Code Division Multiple Access (WCDMA), Global System for Mobile communications/enhanced Data rate for GSM Evolution (GSM/EDGE), Worldwide Interoperability for Microwave Access (WiMAX), or Ultra Mobile Broadband (UM B), just to mention a few possible implementations.

As will be readily understood by those familiar with communications design, that functions means or circuits may be implemented using digital logic and/or one or more microcontrollers, microprocessors, or other digital hardware. In some embodiments, several or all of the various functions may be implemented together, such as in a single application-specific integrated circuit (ASIC), or in two or more separate devices with appropriate hardware and/or software interfaces between them. Several of the functions may be implemented on a processor shared with other functional components of a UE or network node, for example.

Alternatively, several of the functional elements of the processing units discussed may be provided through the use of dedicated hardware, while others are provided with hardware for executing software, in association with the appropriate software or firmware. Thus, the term "processor" or "controller" as used herein does not exclusively refer to hardware capable of executing software and may implicitly include, without limitation, digital signal processor (DSP) hardware and/or program or application data. Other hardware, conventional and/or custom, may also be included. Designers of communications devices will appreciate the cost, performance, and maintenance trade-offs inherent in these design choices.

It will be appreciated that the foregoing description and the accompanying drawings represent non-limiting examples of the methods and apparatus taught herein. As such, the apparatus and techniques taught herein are not limited by the foregoing description and accompanying drawings. Instead, the embodiments herein are limited only by the following claims and their legal equivalents.

The invention claimed is:

1. A method performed by a network node for handling communication in a communication network, the method comprising:

configuring a channel state information, CSI, reference resource as a function of:

a periodic transmission time of a downlink, DL, semi-persistent scheduling, SPS, configuration or a group of DL SPS configurations, a bandwidth of the CSI reference resource containing a same amount of physical resource blocks, PRBs, as used by a DL SPS configuration, and a location of the PRBs varying.

2. The method according to claim 1, wherein the CSI reference resource starts X orthogonal frequency-division multiplexing, OFDM, symbols before the one or both of the DL SPS configuration and the dynamic PDSCH transmission.

3. The method according to claim 1, wherein the CSI reference resource end Y OFDM symbols after the end of the PDSCH transmission.

4. The method according to claim 1, wherein the CSI reference resource is related with a subset of PDSCH transmissions within a defined period.

5. The method according to claim 1, wherein one or both of:

a CSI-reference signal, RS; and interference measurement, IM, periodicity, and offset, are configured depending on a DL SPS periodicity.

6. The method according to claim 1, wherein the CSI reference resource corresponds to a group of downlink PRBs that are used by the DL SPS configuration, or the group of DL SPS configurations, in a frequency domain.

7. The method according to claim 1, wherein a CSI-reference signal, RS, is configured based on the needs of the DL SPS configuration.

8. The method according to claim 1, wherein time domain resources of a non-zero power CSI-reference signal, RS, is configured as a function of the time domain resources used by the DL SPS configuration, wherein the time domain resources comprise periodicity and slot offset.

9. The method according to claim 1, wherein a CSI-reference signal, RS, is transmitted with N1 times a periodicity of the DL SPS configuration, wherein N1 is an integer value.

10. A method performed by a user equipment, UE, for handling communication in a communication network, the method comprising:

deriving a channel state information, CSI, reference resource based on a dynamically scheduled physical downlink shared channel, PDSCH, a downlink, DL, semi-persistent scheduling, SPS, configuration or a group of DL SPS configurations, a bandwidth of the CSI reference resource containing a same amount of physical resource blocks, PRBs, as used by a DL SPS configuration, and a location of the PRBs varying;

performing a channel estimation based on the CSI reference resource;

generating a CSI report based on the channel estimation; and transmitting the CSI report to a network node.

11. The method according to claim 10, further comprises receiving additional signalling to activate CSI reporting.

12. The method according to claim 10, further comprises receiving additional signalling to deactivate CSI reporting.

13. A network node for handling communication in a communication network, the network node comprising processing circuitry configured to:

configure a channel state information, CSI, reference resource as a function of:

a periodic transmission time of a downlink, DL, semi-persistent scheduling, SPS, configuration or a group of DL SPS configurations, a bandwidth of the CSI reference resource containing a same amount of physical resource blocks, PRBs, as used by a DL SPS configuration, and a location of the PRBs varying.

14. The network node according to claim 13, wherein the CSI reference resource is adapted to start X orthogonal frequency-division multiplexing, OFDM, symbols before the one or both of the DL SPS configuration and the dynamic PDSCH transmission.

15. The network node according to claim 13, wherein the CSI reference resource is adapted to end Y OFDM symbols after the end of the PDSCH transmission.

16. The network node according to claim 13, wherein the CSI reference resource is related with a subset of PDSCH transmissions within a defined period.

17. A user equipment, UE, for handling communication in a communication network, the UE comprising processing circuitry configured to:

derive a channel state information, CSI, reference resource based on a dynamically scheduled physical downlink shared channel, PDSCH, a downlink, DL, semi-persistent scheduling, SPS, configuration or a group of DL SPS configurations, a bandwidth of the CSI reference resource containing a same amount of physical resource blocks, PRBs, as used by a DL SPS configuration, and a location of the PRBs varying;

perform a channel estimation based on the CSI reference resource;

generate a CSI report based on the channel estimation; and transmit the CSI report to a network node.

18. The UE according to claim 17, wherein the UE is further configured to receive additional signalling to activate CSI reporting.

19. The UE according to claim 17, wherein the UE is further configured to receive additional signalling to deactivate CSI reporting.

* * * * *